United States Patent Office 2,939,792
Patented June 7, 1960

---

2,939,792

DRY-MIX SOUFFLE PRODUCTS AND THE PREPARATION THEREOF

Ralph W. Kline, Oak Lawn, and Alan Barde Rogers, Palos Park, Ill., assignors to Armour and Company, Chicago, Ill., a corporation of Illinois No Drawing. Filed Oct. 3, 1957, Ser. No. 687,858

8 Claims. (Cl. 99—94)

This invention relates to dry food products. In particular it relates to dry food products which, following reconstitution with water, form edible baking products. More particularly, this invention relates to dry-mix food compositions from which souffles and related baked products can be produced.

One of the most difficult baking problems has been the production of high grade souffles. The types, proportions and characteristics of materials employed in such bakery products are so critical that it is very difficult to obtain a good souffle of the proper texture, fluffiness and quality. In fact souffles are rarely made except by experienced cooks because these products are real tests of culinary skill. Heretofore it has not been practical to market a standard dry-mix formula which can be reconstituted with water for effective use in preparing souffles.

It is an object of this invention to provide an improved dry food mix suitable for the production of souffles and related baked products. Another object is the development of a product and process which will permit substantially any cook to produce a high grade souffle. A third object of the invention is to provide a method for producing dry mixed products suitable for producing souffles. These and other objects will be apparent from and are achieved in accordance with the following disclosure.

The present invention comprises a dry food mix in the form of two components. The first component contains a major amount of coagulable edible protein, such as white of egg or lactalbumin, and a relatively small portion of a mixture of salts, one an acid phosphate, such as cream of tartar, and the other a flavoring salt, such as sodium chloride or sodium phosphate. This first (protein) component should comprise, on a dry weight basis, about 85% to 95% coagulable edible protein and the remainder of the component should be a mixture of salts.

The second component comprises dried egg yolk, an edible fat, dry milk solids, flour and flavoring material. The edible fat may be cream, butter, butter oil, vegetable fat or animal fat. In producing this dry component, it is important that the fat and liquid egg yolks be mixed together and then spray-dried in order to form a dry powder; the mere mixing of the individual dried ingredients does not give a satisfactory food mix. Milk or other dairy liquid may be mixed with the fat and egg yolks prior to drying, or non-fat milk solids may be added after the mixture of fat and egg yolks is dried. After the dry mix is prepared as above, flour (such as bread flour, cake flour, instant starch or tapioca flour) and flavoring material, are added to complete the second component.

The relative proportions of dry ingredients in the second (egg yolk) composition may vary over fairly wide ranges. In general the amounts (dry weight basis) will be within the following limits:

| Ingredients: | Parts by weight |
|---|---|
| Flour | 20 to 45 |
| Milk solids | 20 to 60 |
| Fat | 15 to 75 |
| Egg yolk | 15 to 50 |

Sufficient flavoring is added as desired. For instance, dry Cheddar cheese in range of 20 to 50 parts by weight may be used in preparing a cheese souffle. In lieu of dry Cheddar cheese, dried cream cheese, cocoa, vanilla extract, meat, mustard, spices, vegetables, fish and fruit in dried form can be added as flavoring. The quantities of these materials will vary according to taste and the relative flavoring power of the various materials.

The relative quantity of moisture in the various dry solids should be controlled within specified limits. For instance, the protein, such as dried egg white, should contain less than 20% moisture and preferably in the range of 6 to 8% moisture. The dry composition comprising the second component of the mix, containing milk solids, fat, dried egg yolks and flour, should, for best results, contain not more than about 5% moisture and preferably less than 3%.

After the two components discussed above have been prepared in dry form they are packaged individually in suitable containers and merchandized in that form. A container which contains one component may be placed with another container which contains the proper amount of the other component to go with the amount of the first component, to form a combination package which is merchandized as a unit. When used in preparing souffles, the first component containing edible coagulable protein and salts is reconstituted by the addition of the appropriate amount of water, generally with sufficient mixing to make a homogeneous composition and then beaten to a stable foam. The second component containing milk solids, fat, egg yolk, flour and flavoring is likewise reconstituted by mixing with the appropriate quantity of water. Then the reconstituted first (protein) component is folded into the reconstituted second (egg yolk) component and the resulting mix is placed in the baking dish and baked at approximate temperature for the desired food product.

The products prepared in accordance with this invention have good shelf-life. On storage at 80° F. for periods as long as eight months there has been no deterioration of the food products. The flavor remains good during prolonged storage. The baked products prepared from the compositions form excellent souffles with good rising properties, absence of collapse, maintenance of cell structure and other desirable properties, resulting in tender fluffy baked goods. These products may be successfully used by inexperienced cooks with much greater success than similar preparations produced from the individual food ingredients in fresh form. Uniformly good results are assured by these mixes. In addition there is great saving in time. Ordinarily the preparation of a souffle requires at least 30 minutes in the kitchen whereas by the use of the dried food mixes of this invention such products can be prepared in no more than 10 minutes with better results than obtained from the usual recipe. Furthermore, while souffles prepared from the usual recipes collapse nearly as rapidly as they cool, those produced in accordance with this invention are exceptionally stable and easy to handle.

The invention is disclosed in more detail by the following examples which are provided for illustration only and are not intended to limit the invention in any way. It will be appreciated by those skilled in the art that various modifications in amounts and nature of ingredients may be made without departing from the invention.

Example 1

A cheese souffle mix is produced in accordance with the following directions:

Component A is prepared from 13.0 lbs. of egg white solids, 0.9 lb. of cream of tartar and 1.0 lb. of salt. The dry materials are blended to form a homogeneous mix.

Component B is prepared by mixing 31.0 lbs. of evaporated milk (26% solids), 7.0 lbs. sweet cream (40% solids), 6.5 lbs. liquid egg yolks (43% solids) and 8.4 lbs. of aged Cheddar cheese. The first three ingredients are mixed thoroughly and the cheese melted and poured into the resultant mixture and homogenized. The mixture is then spray-dried to a dry powder weighing 20.5 lbs. To this dry powder is added 3.5 lbs of tapioca flour and the dry materials thoroughly mixed together.

In baking a cheese souffle the following procedure is followed: 14.9 grams of the egg white Component A are beaten into 77 grams of water for 2 minutes with an electric kitchen mixer. Then 225 grams of the egg yolk Component B are beaten into 298 grams of water with an electric kitchen mixer. The egg white reconstituted Component A is then folded into the egg yolk reconstituted Component B and the batter placed in a baking dish and baked at 375° F. in an oven for 1 hour. A cheese souffle thus prepared rises to a height of about 4 inches in the baking pan and is light, fluffy and tasty.

Example 2

A chocolate souffle mix is prepared as follows:

A mixture of 13 lbs. of egg white solids, 1 lb. of salt and 14½ oz. of cream of tartar is dry blended to form Component A.

Component B is formed by blending while wet a mixture of 5 lbs. butter fat, 7 lbs. egg yolk, 2½ lbs. flour (a blend of equal parts of instant starch and bread flour), 3½ lbs. cocoa and 10 lbs. of water until homogenized. The mixture is spray-dried and into the dried mixture is incorporated 3½ lbs. non-fat dry milk solids.

The souffle is made as follows: 175 grams of the egg yolk Component B is added to 230 cc. of hot water and beaten for 2 minutes with an electric kitchen mixer. Then 14.9 grams of the egg white Component A is mixed with 80 cc. of cool water and beaten to a stiff peak in about 2 minutes with an electric kitchen mixer. The beaten egg yolk mix is folded into the beaten egg white mix and baked in a 1½-quart casserole at 375° F. for about 1 hour.

Example 3

A fluffy omelet mix is prepared according to the following procedure:

An egg white Component A is prepared by dry blending 13 lbs. of egg white solids, 1 lb. of salt and 14 oz. of cream of tartar to form a uniform mixture.

An egg yolk Component B is prepared by mixing 16 lbs. of liquid egg yolks, 1½ lbs. of flour and 1½ lbs. of instant (pre-gelatinized) starch and spray-drying the liquid mixture to form a dry powder.

To prepare a fluffy omelet, 15 grams of the egg white Component A are reconstituted with 91 grams of water and beaten to a soft peak. Then 55 grams of the egg yolk Component B is beaten into 65 grams of hot water and the egg white mixture is folded into the egg yolk mixture. The total mixture is then cooked in a skillet until a fluffy omelet is obtained.

What is claimed as new and is desired to be secured by Letters Patent of the United States is:

1. A dry food product reconstitutable in water to prepare a cheese souffle, comprising 20 to 45 parts of flour, 20 to 60 parts of milk solids, and a spray dried mixture of 15 to 75 parts of edible fat, 15 to 50 parts of egg yolk and 20 to 50 parts of cheese, wherein the moisture content of the spray dried mixture is not greater than 5%.

2. A dry food product reconstitutable in water to prepare a cheese souffle, comprising: (a) a dry protein component comprising 6 to 13 parts of edible coagulable protein selected from the group consisting of egg white and egg white substitutes, said egg white substitutes being capable of providing a foam that can be stabilized at oven temperatures, and 1 to 2 parts of a mixture of edible salts consisting of an acid phosphate and a flavoring salt; and (b) an egg yolk component comprising 20 to 45 parts of flour, 20 to 60 parts of milk solids, and a spray dried mixture of 15 to 75 parts of edible fat, 15 to 50 parts of egg yolk and 20 to 50 parts of cheese, wherein the moisture content of the spray dried mixture is not greater than about 5%.

3. A dry food product as claimed in claim 2 wherein the edible coagulable protein is dried egg white and the flavoring salt is selected from the group consisting of sodium chloride and sodium phosphate.

4. A dry food product reconstitutable in water to prepare a souffle, comprising 20 to 45 parts of flour and flavoring and a spray dried mixture of 15 to 75 parts of edible fat, 15 to 50 parts of egg yolk and 20 to 60 parts of milk solids, wherein the moisture content of the spray dried mixture is not greater than about 5%.

5. A dry food product reconstitutable in water to prepare a souffle, comprising: (a) a dry protein component comprising 6 to 13 parts of edible coagulable protein selected from the group consisting of egg white and egg white substitutes, said egg white substitutes being capable of providing a foam that can be stabilized at oven temperatures, and 1 to 2 parts of a mixture of edible salts consisting of an acid phosphate and a flavoring salt; and (b) an egg yolk component comprising 20 to 45 parts of flour and flavoring and a spray dried mixture of 15 to 75 parts of edible fat, 15 to 50 parts of egg yolk and 20 to 60 parts of milk solids, wherein the moisture content of the spray dried mixture is not greater than about 5%.

6. A dry food product as claimed in claim 5 wherein the edible coagulable protein is dried egg white and the flavoring salt is selected from the group consisting of sodium chloride and sodium phosphate.

7. A method of preparing a dry food product reconstitutable in water to prepare a cheese souffle, comprising admixing 15 to 75 parts of edible fat, 15 to 50 parts of egg yolk and 20 to 50 parts of cheese, spray drying the resultant mixture to a powder having a moisture content not greater than about 5% and admixing therewith 20 to 45 parts of flour and 20 to 60 parts of milk solids.

8. A method of preparing a dry food product reconstitutable in water to prepare a souffle, comprising admixing 15 to 75 parts of edible fat, 15 to 50 parts of egg yolk and 20 to 60 parts of milk solids, spray drying the resultant mixture to a powder wherein the moisture content is not greater than about 5% and admixing therewith 20 to 45 parts of flour and flavoring.

References Cited in the file of this patent

UNITED STATES PATENTS

| | | |
|---|---|---|
| 2,471,435 | Kimball et al. | May 31, 1949 |
| 2,479,310 | Chapin | Aug. 16, 1949 |
| 2,520,954 | North et al. | Sept. 5, 1950 |

OTHER REFERENCES

Culinary Arts Institute Encyclopedic Cookbook, 1948, edited by Berolzheimer, published by Culinary Arts Inst. (Chicago), p. 622.

Betty Crocker's Picture Cook Book, 1950, published by McGraw-Hill Book Co. Inc. (New York), p. 392.

The New Fanny Farmer Boston Cooking School Cook Book, 1951, ninth ed., revised by Perkins, published by Little, Brown and Co. (Boston), p. 174.